United States Patent

Hegner et al.

(10) Patent No.: US 6,427,900 B1
(45) Date of Patent: Aug. 6, 2002

(54) ACTIVE BRAZING SOLDER FOR BRAZING ALUMINA-CERAMIC PARTS

(75) Inventors: Frank Hegner, Lörrach; Elke Maria Schmidt, Schopfheim; Volker Güther, Burgthann; Andreas Otto, Fürth; Jürgen Breme, Heusweiler; Heinz Müller, Merchweiler; Jürgen Peter Turnsek, Völkingen, all of (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/455,690

(22) Filed: Dec. 7, 1999

Related U.S. Application Data

(63) Continuation of application No. 08/896,481, filed on Jul. 18, 1997.
(60) Provisional application No. 60/023,079, filed on Aug. 2, 1996.

(30) Foreign Application Priority Data

Jul. 25, 1996 (DE) .......................... 96 11 987

(51) Int. Cl.[7] .............................................. B23K 31/02
(52) U.S. Cl. .................................... 228/121; 228/124.5
(58) Field of Search ................ 420/422, 421; 148/421; 228/121, 124.5

(56) References Cited

U.S. PATENT DOCUMENTS

| | | | |
|---|---|---|---|
| 3,038,249 A | 6/1962 | Gilliland et al. | |
| 3,104,972 A | 9/1963 | Droegkamp et al. | |
| 4,050,931 A | 9/1977 | Tanner et al. | |
| 4,064,757 A | * 12/1977 | Hasegawa | 73/362 |
| 5,351,938 A | 10/1994 | Hegner et al. | |
| 5,368,659 A | 11/1994 | Peker et al. | |
| 5,400,489 A | * 3/1995 | Hepner et al. | 29/25.41 |
| 5,431,744 A | 7/1995 | Breme et al. | |
| 5,589,012 A | 12/1996 | Hobby et al. | |

FOREIGN PATENT DOCUMENTS

| | | |
|---|---|---|
| DE | 1175059 | 7/1964 |
| DE | 1201663 | 9/1965 |
| GB | 1094052 | 12/1965 |
| RU | 2009241 | 3/1994 |
| RU | 2009241 C1 * | 3/1994 |
| WO | WO 94/23078 | 10/1994 |

OTHER PUBLICATIONS

Fox, C. W. and Slaughter, G.M., *Brzing of Ceramics*, Welding Journal, Jul. 1964, pp. 591–597.

* cited by examiner

Primary Examiner—George Wyszomierski
Assistant Examiner—Janelle Combs-Morillo
(74) Attorney, Agent, or Firm—Bose McKinney & Evans LLP

(57) ABSTRACT

The active brazing solder for brazing ceramic parts of alumina, particularly of high-purity alumina, contains a maximum of 12 wt. % Ti, a maximum of 8 wt. % Be, and less than 16.5 wt. % Fe, the remainder being Zr and any impurities that may be present. The active brazing solder has the following behaviour/features: Brazing temperature: lower than 1,000° C.; the brazed joint is high-vacuum-tight over a long period of time; the coefficient of thermal expansion of the active brazing alloy is substantially identical to that of the alumina ceramic in the entire temperature range covered during the brazing process; the strength of the brazed joint between the two ceramic parts is so high that under tensile loading, fracture will result not at the joint, but in the adjacent ceramic; the pressure resistance of the active brazing solder is greater than 2 GPa; the active brazing solder is very good processable into powders having particle sizes on the order of 10 μm.

20 Claims, 1 Drawing Sheet

| | $T_L$ / °C | $R_M$ / MPa |
|---|---|---|
| (ZrFe16.5Ti9)99Be1 | 960 | 38 |
| (ZrFe16.5Ti9)98Be2 | 920 | 116 |
| ZrTi10Be4 | 940 | 35 |

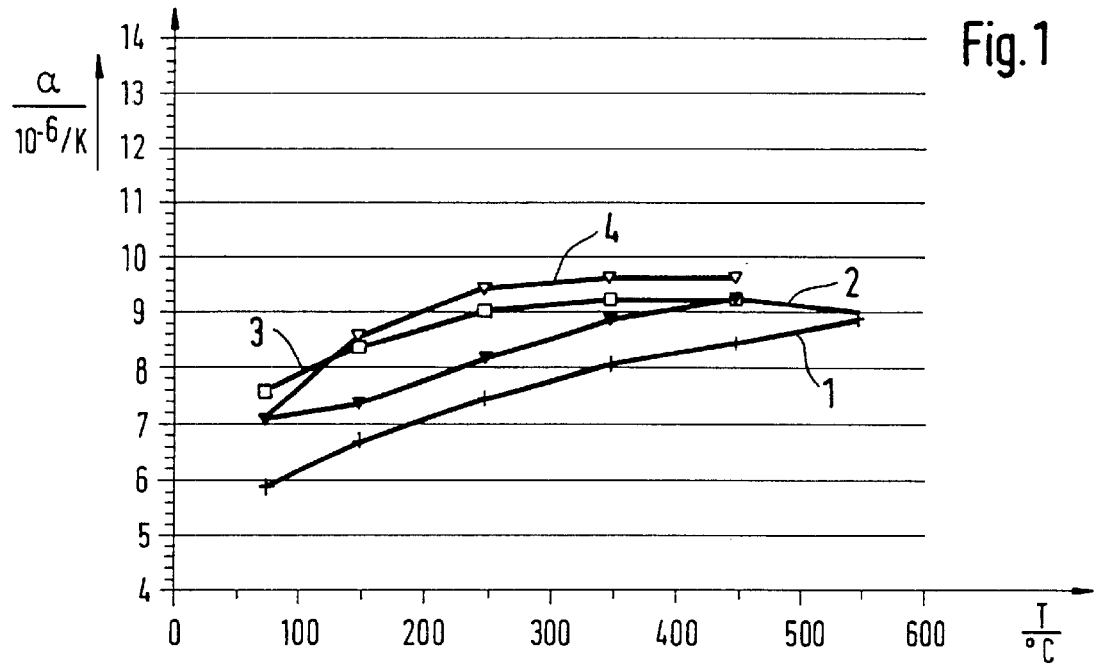
Fig. 1
Fig. 2
| | $T_L$ / °C | $R_M$ / MPa |
|---|---|---|
| (ZrFe16.5Ti9)99Be1 | 960 | 38 |
| (ZrFe16.5Ti9)98Be2 | 920 | 116 |
| ZrTi10Be4 | 940 | 35 |
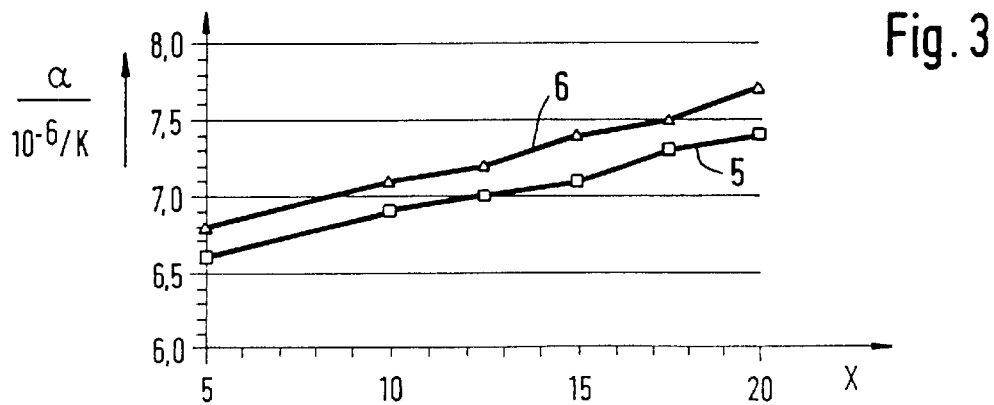
Fig. 3

ACTIVE BRAZING SOLDER FOR BRAZING ALUMINA-CERAMIC PARTS

This application claims priority from provisional application Ser. No. 60/023,079, filed Aug. 2, 1996.

This is a continuation of application Ser. No. 08/896,481 filed Jul. 18, 1997.

FIELD OF THE INVENTION

The present invention relates to active brazing solders for brazing ceramic parts of alumina, particularly of high-purity alumina.

BACKGROUND OF THE INVENTION

Active brazing solders are alloys which contain at least one element having an affinity for oxygen, such as titanium. They attack the covalent or ionic bonding of the ceramic surfaces to be brazed, wet these surfaces, and thus unite chemically and mechanically with them. Therefore, brazing requires no fluxes whatsoever.

Part of these active brazing solders, if they are brittle and difficult to machine or unmachinable in the solidified condition, can be produced by melt-spinning in the form of thin strips, which can then be easily machined, e.g., stamped or cut.

Thus, shaped active brazing foil parts, such as rings, can be produced, which are placed between the ceramic parts to be brazed and are subsequently fused with the latter.

Part of the molten and solidified active brazing alloys may also be ground into powder and processed in this form into an active brazing paste, which can also be introduced between the ceramic parts, e.g., in the form of a ring, and subsequently fused with these parts.

When brazing ceramic parts of alumina, particularly of 99.9 percent, i.e., high-purity, alumina as is needed and used for capacitive or resistive ceramic pressure sensors, particularly absolute-pressure sensors, the active brazing solder must meet several requirements; in particular, it must have the following properties:

The temperature at which the sintered alumina ceramic is brazed, i.e., the brazing temperature, must be below 1000° C., preferably between 700° C. and 980° C.

The brazed joint must be high-vacuum-tight over a long period of time, so that a vacuum existing during the brazing process in the chamber of a pressure sensor, for example, which is closed by the brazing, will remain unchanged.

The coefficient of thermal expansion of the active brazing alloy should be identical to that of the alumina ceramic in the entire temperature range covered during the brazing process, so that only minimal stress will be developed during cooling from the brazing temperature to the ambient temperature.

The strength of the brazed joint between the two ceramic parts must be so high that under tensile loading, fracture will result not at the joint, but in the adjacent ceramic.

The pressure resistance of the active brazing solder must be at least 2 GPa (=2 Gigapascals).

An active brazing solder which meets these requirements should also be processable into the aforementioned active brazing pastes, since the melt-spinning process, if applicable, requires costly and complicated equipment, so that the active brazing foils produced therewith are expensive.

With active brazing solders such as the zirconium-nickel-titanium alloys described in U.S. Pat. No. 5,351,938 (in the following abbreviated, as usual, as ZrNiTi alloys) not all of the above-mentioned boundary conditions can be fulfilled in a completely satisfactory manner. In particular, the above-mentioned requirement that the coefficients of thermal expansion of the active brazing solder and the alumina should be identical over the entire temperature range is not met, this requirement being based on new knowledge gained by the inventors.

SUMMARY OF THE INVENTION

It was therefore necessary, and this is the problem underlying the invention, to look for compositions of active brazing solders which are different from those of the prior art zirconium-nickel-titanium alloys.

The invention provides an active brazing solder for brazing alumina-ceramic parts which contains a maximum of 12 wt. % titanium, a maximum of 8 wt. % beryllium, and less than 16.5 wt. % iron, the remainder being zirconium and any impurities that may be present.

In one preferred embodiment of the invention, the active brazing solder contains 8.6 wt. % titanium, 4 wt. % beryllium, and 15.8 wt. % iron.

In another preferred embodiment, the active brazing solder contains 8.8 wt. % titanium, 2 wt. % beryllium, and 16.2 wt. % iron.

In a further preferred embodiment, the active brazing solder contains 8.9 wt. % titanium, 1 wt. % beryllium, and 16.3 wt. % iron.

In still another preferred embodiment of the invention, the active brazing solder contains 10 wt. % titanium and 4 wt. % beryllium, but no iron.

An essential advantage of the active brazing solders according to the invention is that they can be ground finely with a higher yield than the ZrNiTi alloys described in the above-mentioned U.S. Pat. No. 5,351,938 using equipment of comparable complexity, and that the grinding under oxygen described in U.S. Pat. No. 5,431,744 can be used.

In the oxygen atmosphere, the melted, cooled, and uncrushed pieces of the active brazing alloys of the invention begin to disintegrate into a hydride powder of the alloy (particle diameter of the order of less than 300 $\mu$m) between 100° C. and 150° C. already at an absolute pressure of approximately 200 kPa (=200 kilopascals=2 bars). In a mill, e.g., a ball mill, this powder can be ground, under hydrogen overpressure and with little expenditure of energy, into powders with a desired mean particle size on the order of 10 $\mu$m, e.g., 12 $\mu$m. The hydrogen can be removed later during the brazing process.

The entire powder production process, namely hydrogenating, grinding, and screening, takes place in the absence of atmospheric oxygen. Grinding, storing, and packaging are carried out under hydrogen or inert-gas overpressure, so that air has no access. This ensures a low oxygen content in the powders, which have a high affinity for oxygen, so that one of the requirements for good brazing properties is met.

BRIEF DESCRIPTION OF THE DRAWINGS

The invention and further advantages will now be explained in more detail with reference to the accompanying drawing, in which:

FIG. 1 is a plot of the expansion coefficients of high-purity alumina and some active brazing solders according to the invention;

FIG. 2 shows various properties of preferred active brazing solders according to the invention in the form of a table; and FIG. 3 is a plot representing the effect of the iron content on the expansion coefficient of a zirconium-iron-titanium alloy.

DETAILED DESCRIPTION OF THE DRAWINGS

Referring to FIG. 1, measured values of the expansion coefficients a of high-purity alumina, i.e., 99.9% alumina, and of some active brazing solders according to the invention are plotted as a function of temperature in the range between approximately 100° C. and approximately 600° C. The ordinate represents the expansion coefficient a in $10^{-6}$/K, and the abscissa represents the temperature T in °C.

Curve 1 shows the coefficient of thermal expansion of high-purity alumina. It runs between approximately $6.10^{-6}$/K at approximately 100° C. and approximately $9.10^{-6}$/K at approximately 550° C. with a slightly negative curvature.

Curve 2 shows the coefficient of thermal expansion of a zirconium-titantium-beryllium active brazing alloy with the composition ZrTi10Be4. This short notation means that the alloy contains 10 wt. % titanium (abbreviated: Ti), 4 wt. % beryllium (abbreviated: Be), and 86 wt. % zirconium (abbreviated: Zr).

Curve 2 runs between approximately $7.10^{-6}$/K at approximately 100° C. and approximately $9.10^{-6}$/K at approximately 550° C., with a slight maximum of approximately $9.2.10^{-6}$/K at approximately 450° C.

Curve 3 shows the coefficient of thermal expansion of the zirconium-iron-titanium-beryllium active brazing alloy with the composition (ZrFe16.5Ti9)99Be1; this means that the alloy contains 1 wt. % beryllium and 99 wt. % of a constituent composed of 16.5 wt. % iron (abbreviated: Fe), 9 wt. % titanium, and 74.5 wt. % zirconium.

The expression in parentheses of (ZrFe16.5Ti9)99Be1 can be multiplied out, so that it can also be written as: ZrFe16.33Ti8.9Be1, i.e., 1 wt. % beryllium, 16.33 wt. % iron, 8.9 wt. % titanium, and 73.77 wt. % zirconium.

Curve 3 runs between approximately $7.5.10^{-6}$/K at approximately 100° C. and approximately $9.2.10^{-6}$/K at approximately 450° C., with a slight maximum of approximately $9.3.10^{-6}$/K at approximately 350° C.

Curve 4 shows the coefficient of the thermal expansion of a zirconium-iron-titanium-beryllium active brazing alloy with the composition (ZrFe16.5Ti9)98Be2; this means that the alloy contains 2 wt. % beryllium and 98 wt. % of a constituent composed of 16.5 wt. % iron, 9 wt. % titanium, and 74.5 wt. % zirconium, or, again multiplied out, ZrFe16.17Ti8.8Be2, i.e., 1 wt. % beryllium, 16.17 wt .% iron, 8.8 wt. % titanium, and 73.03 wt. % zirconium.

Curve 4 runs between approximately $7.10^{-6}$/K at approximately 100° C. and approximately $9.7.10^{-6}$/K at approximately 350° C.

FIG. 1 shows that the expansion coefficient of the active brazing alloy ZrTi10Be4, which is represented by curve 2, comes closest to the expansion coefficient of high-purity alumina, and that in the temperature range shown, the expansion coefficient of the active brazing alloy differs from that of alumina by a substantially constant amount, which is only approximately $+0.8.10^{-6}$/K.

According to the table of FIG. 2, however, at a brazing temperature $T_L$ of 940° C., this active brazing alloy ZrTi10Be4 has a tensile strength $R_M$ of approximately 35 MPa (=35 Megapascals), which is adequate in certain cases, but appears not yet suitable for the wide range of possible applications.

The highest value of the tensile strength $R_M$ together with the lowest value of the brazing temperature $T_L$ is achieved with the active brazing alloy (ZrFe16.5Ti9)98Be2 according to curve 4 of FIG. 1, namely a value of $R_M \approx 116$ MPa and a value of $T_L = 920°$ C.

In the temperature range in which pressure sensors are commonly used, the coefficient of thermal expansion of the active brazing alloy (ZrFe16.6Ti9)98Be2 is nearly equal to that of the active brazing alloy ZrTi10Be4.

To confirm a presumption on the part of the inventors that the aforementioned approximation of the coefficient of thermal expansion a to that of alumina is due to the iron content of the active brazing alloys, FIG. 3 shows the result of measurements made to determine this effect of iron. Zirconium-iron-titanium alloys of the composition ZrFe$_x$Ti10 were chosen, where the subscript x indicates the varying iron content during the measurements, again in wt. %.

Curve 5 of FIG. 3 shows the respective coefficient of thermal expansion between 50° C. and 200° C., and curve 6 shows the respective coefficient of expansion between 100° C. and 200° C. From the virtually constant slopes of curves 5 and 6 the inventors have drawn the conclusion that, if the iron content x becomes vanishingly small, the expansion coefficient α is smallest, namely approximately $6.3.10^{-6}$/K.

This probably accounts for the fact that the values of the expansion coefficient of the iron-free alloy ZrTi10Be4 according to curve 2 of FIG. 1 are lower than those of the iron-containing alloys of curves 3 and 4 of FIG. 1.

What is claimed is:

1. A method of forming a brazed joint between a first alumina-ceramic part and a second alumina-ceramic part, comprising the steps of:

applying to a joint formed by said first alumina-ceramic part and said second alumina-ceramic part an active brazing solder consisting essentially of 8.6 wt. % to 12 wt. % titanium, 1 wt. % to 8 wt. % beryllium, 0 wt. % to 16.5 wt. % iron, 63.5 wt. % to 90.4 wt. % zirconium, and a remainder being any impurities;

heating said active brazing solder applied to said joint to a brazing temperature in order to melt said active brazing solder and wet said first alumina-ceramic part and said second alumina-ceramic part with said active brazing solder; and cooling said active brazing solder after said heating step to an ambient temperature to form said brazed joint between said first alumina-ceramic part and said second alumina-ceramic part.

2. The method of claim 1, wherein said brazing temperature is below 1000° C.

3. The method of claim 1, wherein said brazing temperature is between 700° C. and 980° C.

4. The method of claim 1, wherein the step of applying comprises the step of applying an active brazing paste comprising said active brazing solder to said joint.

5. The method of claim 1, wherein said active brazing solder consists essentially of about 10 wt. % titanium, about 4 wt. % beryllium, and about 86 wt. % zirconium.

6. The method of claim 1, wherein said active brazing solder consists essentially of about 8.6 wt. % titanium, about 4 wt. % beryllium, about 15.8 wt. % iron, and about 71.6 wt. % zirconium.

7. The method of claim 1, wherein said active brazing solder consists essentially of about 8.8 wt. % titanium, about 2 wt. % beryllium, about 16.2 wt. % iron, and about 73 wt. % zirconium.

8. The method of claim 1, wherein said active brazing solder consists essentially of about 8.9 wt. % titanium, about 1 wt. % beryllium, about 16.3 wt. % iron, and about 73.8 wt. % zirconium.

9. A method of forming a brazed joint between a first alumina-ceramic part and a second alumina-ceramic part, comprising the steps of:

applying to a joint formed by said first alumina-ceramic part and said second alumina-ceramic part an active brazing solder comprising about 10 wt. % titanium, about 4 wt. % beryllium, and about 86 wt. % zirconium;

heating said active brazing solder applied to said joint to a brazing temperature in order to melt said active brazing solder and wet said first alumina-ceramic part and said second alumina-ceramic part with said active brazing solder; and cooling said active brazing solder after said heating step to an ambient temperature to form said brazed joint between said first alumina-ceramic part and said second alumina-ceramic part.

10. A method of forming a brazed joint between a first alumina-ceramic part and a second alumina-ceramic part, comprising the steps of:

applying to a joint formed by said first alumina-ceramic part and said second alumina-ceramic part an active brazing solder comprising about 8.6 wt. % titanium, about 4 wt. % beryllium, about 15.8 wt. % iron, and about 71.6 wt. % zirconium;

heating said active brazing solder applied to said joint to a brazing temperature in order to melt said active brazing solder and wet said first alumina-ceramic part and said second alumina-ceramic part with said active brazing solder; and cooling said active brazing solder after said heating step to an ambient temperature to form said brazed joint between said first alumina-ceramic part and said second alumina-ceramic part.

11. A method of forming a brazed joint between a first alumina-ceramic part and a second alumina-ceramic part, comprising the steps of:

applying to a joint formed by said first alumina-ceramic part and said second alumina-ceramic part an active brazing solder comprising about 8.8 wt. % titanium, about 2 wt. % beryllium, about 16.2 wt. % iron, and about 73 wt. % zirconium;

heating said active brazing solder applied to said joint to a brazing temperature in order to melt said active brazing solder and wet said first alumina-ceramic part and said second alumina-ceramic part with said active brazing solder; and cooling said active brazing solder after said heating step to an ambient temperature to form said brazed joint between said first alumina-ceramic part and said second alumina-ceramic part.

12. A method of forming a brazed joint between a first alumina-ceramic part and a second alumina-ceramic part, comprising the steps of:

applying to a joint formed by said first alumina-ceramic part and said second alumina-ceramic part an active brazing solder comprising about 8.9 wt. % titanium, about 1 wt. % beryllium, about 16.3 wt. % iron, and about 73.8 wt. % zirconium;

heating said active brazing solder applied to said joint to a brazing temperature in order to melt said active brazing solder and wet said first alumina-ceramic part and said second alumina-ceramic part with said active brazing solder; and cooling said active brazing solder after said heating step to an ambient temperature to form said brazed joint between said first alumina-ceramic part and said second alumina-ceramic part.

13. A method of for a brazed joint between a first alumina-ceramic part of a pressure sensor and a second alumina-ceramic part of the pressure sensor, comprising the steps of:

placing said first alumina-ceramic part of said pressure sensor adjacent said second alumina-ceramic part of said pressure sensor to form a joint between said first alumina-ceramic part of said pressure sensor and said second alumina-ceramic part of said pressure sensor;

applying to said joint formed by said first alumina-ceramic part of said pressure-sensor and said second alumina-ceramic part of said pressure sensor an active brazing solder consisting essentially of 8.6 wt. % to 12 wt. % titanium, 1 wt. % to 8 wt. % beryllium, 0 wt. % to 16.5 wt. % iron, 63.5 wt. % to 90.4 wt. % zirconium, and a remainder being any impurities;

heating said active brazing solder applied to said joint to a brazing temperature in order to melt said active brazing solder and wet said first alumina-ceramic part of said pressure sensor and said second alumina-ceramic part of said pressure sensor with said active brazing solder; and cooling said active brazing solder after said heating step to an ambient temperature to. form said brazed joint between said first alumina-ceramic part of said pressure sensor and said second alumina-ceramic part of said pressure sensor.

14. The method of claim 13, wherein said brazing temperature is below 1000° C.

15. The method of claim 13, wherein said brazing temperature is between 700° C. and 980° C.

16. The method of claim 13, wherein the step of applying comprises the step of applying an active brazing paste comprising said active brazing solder to said joint.

17. The method of claim 13, wherein said active brazing solder consists essentially of about 10 wt. % titanium, about 4 wt. % beryllium, and about 86 wt. % zirconium.

18. The method of claim 13, wherein said active brazing solder consists essentially of about 8.6 wt. % titanium, about 4 wt. % beryllium, about 15.8 wt. % iron, and about 71.6 wt. % zirconium.

19. The method of claim 13, wherein said active brazing solder consists essentially of about 8.8 wt. % titanium, about 2 wt. % beryllium, about 16.2 wt. % iron, and about 73 wt. % zirconium.

20. The method of claim 13, wherein said active brazing solder consists essentially of about 8.9 wt. % titanium, about 1 wt. % beryllium, about 16.3 wt. % iron, and about 73.8 wt. % zirconium.

* * * * *

UNITED STATES PATENT AND TRADEMARK OFFICE
CERTIFICATE OF CORRECTION

PATENT NO. : 6,427,900 B1
DATED : August 6, 2002
INVENTOR(S) : Frank Hegner, Elke Maria Schmidt, Volker Güther, Andreas Otto, Jürgen Breme, Heinz Müller and Jürgen Peter Turnsek It is certified that error appears in the above-identified patent and that said Letters Patent is hereby corrected as shown below:

<u>Title page,</u>
Item [56], U.S. PATENT DOCUMENTS, please correct the following misspelled applicant name on the cited reference number 5,400,489:

-- 5,400,489 A      3/1995      Hegner et al.     ............... 29/25.41 --

Signed and Sealed this

Tenth Day of December, 2002

JAMES E. ROGAN
*Director of the United States Patent and Trademark Office*